United States Patent
Burton et al.

(10) Patent No.: US 9,578,716 B2
(45) Date of Patent: Feb. 21, 2017

(54) APPARATUS FOR USING HEAT PIPES IN CONTROLLING TEMPERATURE OF AN LED LIGHT UNIT

(71) Applicant: Dialight Corporation, Farmingdale, NJ (US)

(72) Inventors: Thomas R. Burton, Germantown, TN (US); John W. Curran, Lebanon, NJ (US); John Patrick Peck, Manasquan, NJ (US); Kenneth J. Zimmer, Freehold, NJ (US); Gregory K. Balczarek, Tinton Falls, NJ (US)

(73) Assignee: Dialight Corporation, Farmingdale, NJ (US)

( * ) Notice: Subject to any disclaimer, the term of this patent is extended or adjusted under 35 U.S.C. 154(b) by 498 days.

(21) Appl. No.: 14/094,485

(22) Filed: Dec. 2, 2013

(65) Prior Publication Data
US 2014/0159578 A1    Jun. 12, 2014

Related U.S. Application Data

(63) Continuation of application No. 12/568,343, filed on Sep. 28, 2009, now Pat. No. 8,596,845, which is a
(Continued)

(51) Int. Cl.
 *F21V 29/00* (2015.01)
 *H05B 33/08* (2006.01)
(Continued)

(52) U.S. Cl.
 CPC .............. *H05B 33/089* (2013.01); *B64F 1/20* (2013.01); *F21K 9/00* (2013.01); *F21S 48/328* (2013.01);
(Continued)

(58) Field of Classification Search
 CPC ........ F21V 29/006; F21V 29/20; F21V 29/30; F21V 29/51; F21V 29/54; F21V 29/56; F21V 29/75; F21V 29/713; F21V 29/763; F21V 29/767; F21V 23/0442; F21V 23/0457; F21S 48/326; F21Y 2111/00; F21Y 2103/003
 See application file for complete search history.

(56) References Cited

U.S. PATENT DOCUMENTS

| | | | |
|---|---|---|---|
| 4,729,076 A | 3/1988 | Masami et al. | |
| 6,483,254 B2 | 11/2002 | Vo et al. | |

(Continued)

FOREIGN PATENT DOCUMENTS

| | | |
|---|---|---|
| DE | 10 2005 005753 | 8/2006 |
| EP | 1 067 332 | 1/2001 |

(Continued)

OTHER PUBLICATIONS

Extended European Search Report for European Patent Application Serial No. 10819221.2, dated Jan. 7, 2014, consists of 7 numbered pages.

(Continued)

*Primary Examiner* — Y M Lee

(57) ABSTRACT

A light emitting diode (LED) light unit is disclosed. For example, the LED light unit includes at least one support plate having one or more inner openings. At least one LED array may be coupled to an LED board. The LED light unit also includes at least one heat pipe coupled to the LED board, wherein said LED board is coupled to the at least one support plate.

20 Claims, 10 Drawing Sheets

Related U.S. Application Data continuation-in-part of application No. 11/770,538, filed on Jun. 28, 2007, now Pat. No. 7,604,380.

(60) Provisional application No. 60/817,880, filed on Jun. 30, 2006.

(51) Int. Cl.

| | | |
|---|---|---|
| *F21V 29/51* | (2015.01) | |
| *F21K 99/00* | (2016.01) | |
| *F21S 8/10* | (2006.01) | |
| *F21V 23/04* | (2006.01) | |
| *B64F 1/20* | (2006.01) | |
| *F21V 29/54* | (2015.01) | |
| *F21V 29/71* | (2015.01) | |
| *F21V 29/75* | (2015.01) | |
| *F21V 29/76* | (2015.01) | |
| *F21W 111/00* | (2006.01) | |
| *F21W 111/06* | (2006.01) | |
| *F21V 29/89* | (2015.01) | |
| *F21Y 101/00* | (2016.01) | |

(52) U.S. Cl.
CPC ......... *F21V 23/0442* (2013.01); *F21V 29/006* (2013.01); *F21V 29/51* (2015.01); *F21V 29/54* (2015.01); *F21V 29/713* (2015.01); *F21V 29/75* (2015.01); *F21V 29/763* (2015.01); *B64D 2203/00* (2013.01); *F21V 29/20* (2013.01); *F21V 29/89* (2015.01); *F21W 2111/00* (2013.01); *F21W 2111/06* (2013.01); *F21Y 2101/00* (2013.01); *F21Y 2103/10* (2016.08); *F21Y 2115/10* (2016.08)

(56) References Cited

U.S. PATENT DOCUMENTS

| | | |
|---|---|---|
| 6,692,251 B1 | 2/2004 | Logan et al. |
| 6,910,794 B2 | 6/2005 | Rice |
| 6,991,356 B2 | 1/2006 | Tsimerman et al. |
| 7,095,187 B2 | 8/2006 | Young |
| 7,175,329 B1 | 2/2007 | Chou |
| 7,208,881 B2 | 4/2007 | Young |
| 7,275,852 B2 | 10/2007 | Kim et al. |
| 7,342,707 B2 | 3/2008 | Roberts et al. |
| 7,510,303 B2 | 3/2009 | Jonsson et al. |
| 7,575,354 B2 | 8/2009 | Woodward |
| 7,604,380 B2 | 10/2009 | Burton et al. |
| 7,736,041 B2 | 6/2010 | Tronquet |
| 8,596,845 B2 | 12/2013 | Burton et al. |
| 2004/0120156 A1 | 6/2004 | Ryan |
| 2004/0213016 A1 | 10/2004 | Rice |
| 2005/0156531 A1 | 7/2005 | Young |
| 2007/0115686 A1 | 5/2007 | Tyberghien |
| 2007/0273290 A1* | 11/2007 | Ashdown ............... F21V 29/006 315/113 |
| 2008/0002410 A1 | 1/2008 | Burton et al. |
| 2008/0013314 A1 | 1/2008 | Ashdown et al. |
| 2008/0025038 A1 | 1/2008 | Chiang |
| 2008/0129206 A1 | 6/2008 | Stam et al. |
| 2008/0225537 A1 | 9/2008 | Tronquet |

FOREIGN PATENT DOCUMENTS

| | | |
|---|---|---|
| JP | H8-300934 A | 11/1996 |
| JP | 3116108 U | 10/2005 |
| JP | 2006286395 A | 10/2006 |
| JP | 2008-545571 | 12/2008 |
| JP | 20090381812 | 2/2009 |
| WO | WO 03/081127 | 10/2003 |
| WO | WO 2006/033998 | 3/2006 |
| WO | WO 2008/005833 | 1/2008 |
| WO | WO 2008/043206 | 4/2008 |

OTHER PUBLICATIONS

Canadian Office Action for Canadian Patent Application Serial No. 2,775,716, dated Feb. 14, 2014, pp. 1-3.
Office Action received in corresponding Australia Application No. 2012-98662, dated Dec. 16, 2014, pp. 1-4.
Japanese Office Action in JP2012-532097 dated Jun. 17, 2014, pp. 1-9.
Supplementary European Search Report and Written Opinion for International Patent Application Serial No. PCT/US2010/047470, search completed Dec. 19, 2013, consists of 7 unnumbered pages.
International Search Report and Written Opinion from PCT/US2010/047470, Jun. 3, 2011, consists of 9 unnumbered pages.
International Preliminary Report on Patentability from PCT/US2010/047470, Apr. 12, 2012, consists of 7 unnumbered pages.
International Search Report and Written Opinion from PCT/US07/72473, Feb. 14, 2008, consists of 9 unnumbered pages.
Examination Report Corresponding Australia Application 2010298662, dated Aug. 15, 2014, pp. 1-4.
Search Report Corresponding Chinese Application 2010800494622, dated Sep. 26, 2014, pp. 1-2.

* cited by examiner

_US 9,578,716 B2_

APPARATUS FOR USING HEAT PIPES IN CONTROLLING TEMPERATURE OF AN LED LIGHT UNIT

CROSS REFERENCE TO RELATED APPLICATIONS

This application is a continuation of recently allowed U.S. patent application Ser. No. 12/568,343, filed on Sep. 28, 2009, which is a continuation-in-part of U.S. patent application Ser. No. 11/770,538, filed on Jun. 28, 2007, now U.S. Pat. No. 7,604,380, which claims priority under 35 U.S.C. §119(e) to the benefit of U.S. Provisional Patent Application No. 60/817,880 filed on Jun. 30, 2006, which are each herein incorporated by reference in their entirety.

FIELD OF THE INVENTION

The present invention relates generally to removing heat from an LED light unit and more specifically to heat pipes and thermoelectric coolers for controlling temperature of an LED light unit.

BACKGROUND OF THE INVENTION

In the past light emitting diodes (LEDs) were limited to power levels under a watt. LEDs are now available in packages over five watts. LEDs are now also available with efficiencies of 100 lumens/watt. These recent advancements have enabled many new applications for LEDs. One example is the use of LEDs for warning devices such as beacon lights. Beacon lights typically emit light with a limited vertical beam spread and at all radials throughout the omnidirectional 360°. More specifically LEDs can be used in strobing beacon applications where xenon strobe tubes were used in the past. Using LEDs (light emitting diodes) to produce warning devices which produce a flash similar to the units employing xenon flashtubes have been discussed. In many applications these devices are positioned on the tops of radio transmission towers, wind turbine generators, refinery stacks, and the like. Such locations make the performance of routine maintenance (such as replacing the flashtube) extremely difficult. The ability to use LEDs with their longer lifetime in place of the xenon tube provides a major advantage.

To provide light output in these devices similar to the xenon flashtube, or other traditional lighting technologies, often requires a large number of LEDs. For example the Federal Aviation Administration requires the operation of white flashing devices at the tops of radio towers during daylight hours. For medium intensity applications, such devices must be capable of producing a minimum of 20,000 effective candelas of light output. To produce this light output using LEDs may require approximately 400 five watt LEDs. Because the light is flashing the LEDs would be run at a duty cycle of less than 100%.

Packaging this large number of LEDs in the small space required for a light signal results in a large concentration of heat. Buildup of heat in an LED die can lead to shorter lifetimes and, in extreme cases, failure of the LED device. Internal die temperatures for LEDs should be kept low in order to maximize the performance and lifetime of the LEDs. Maximum LED die temperatures range from about 125° C. to 150° C.

SUMMARY OF THE INVENTION

In one embodiment, the present invention provides a light emitting diode (LED) light unit. The LED light unit comprises at least one support plate having one or more inner openings, at least one LED array coupled to an LED board and at least one heat pipe coupled to said LED board, wherein said LED board is coupled to said at least one support plate.

In another embodiment, the present invention provides an LED light unit comprising a plurality of support plates, wherein each one of said plurality of support plates has one or more inner openings and each one of said plurality of support plates is stacked vertically and coupled to a center column. The LED light unit also comprises at least one LED array coupled to an LED board, a heat collector coupled to said LED board and at least one heat pipe coupled to said heat collector. The at least one heat pipe may be coupled to said heat collector such that said at least one heat pipe is directly beneath and parallel to said at least one LED array, wherein said at least one heat pipe coupled to one of said plurality of support plates.

In another embodiment, the present invention provides an LED light unit comprising at least one LED array coupled to an LED board, at least one heat collector, at least one LED board, wherein said LED board is coupled to said at least one heat collector and at least one heat pipe coupled to said heat collector.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
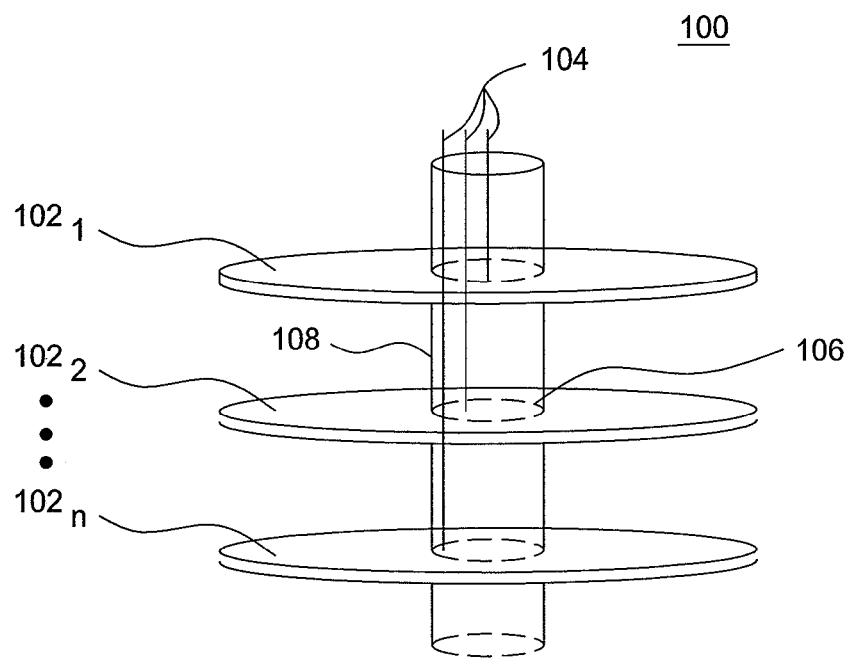
FIG. 1 illustrates a high level block diagram of an exemplary embodiment of the present invention.

FIG. 1 illustrates a high level block diagram of an exemplary embodiment of a light emitting diode (LED) light unit 100 of the present invention. The LED light unit 100 may be, for example, a beacon placed on radio transmission towers, wind turbine generators, refinery stacks and the like. The LED light unit 100 may utilize LEDs that flash, for example in a strobe unit, or LEDs that continuously emit light, for example that are always in an on position. The LED light unit 100 may include at least one support plate 102$_1$ to $102_n$. Hereinafter, the support plates $102_1$ to $102_n$ may be referred to individually or collectively as support plate 102. The support plate 102 may be any geometry, for example circular or any polygonal shape, for example a square, hexagon, octagon and the like. In an exemplary embodiment, the support plate 102 may be circular for the purposes of discussing the present invention. Furthermore, the support plate 102 may be constructed from any thermally conductive material such as, for example, copper, aluminum and the like.

The support plate 102 may have at least one array of LEDs (not shown) coupled to the support plate 102. In an exemplary embodiment, the LED light unit 100 includes three support plates 102. One skilled in the art will recognize that the LED light unit 100 is not limited to any number of support plates 102. The LED light unit 100 may be modular. That is, the LED light unit 100 may have support plates 102 added or removed as the number of LEDs required changes due to the increased or decreased efficiency of the LEDs that are used, or as required by the photometric requirements of a particular application.

Figure 3:
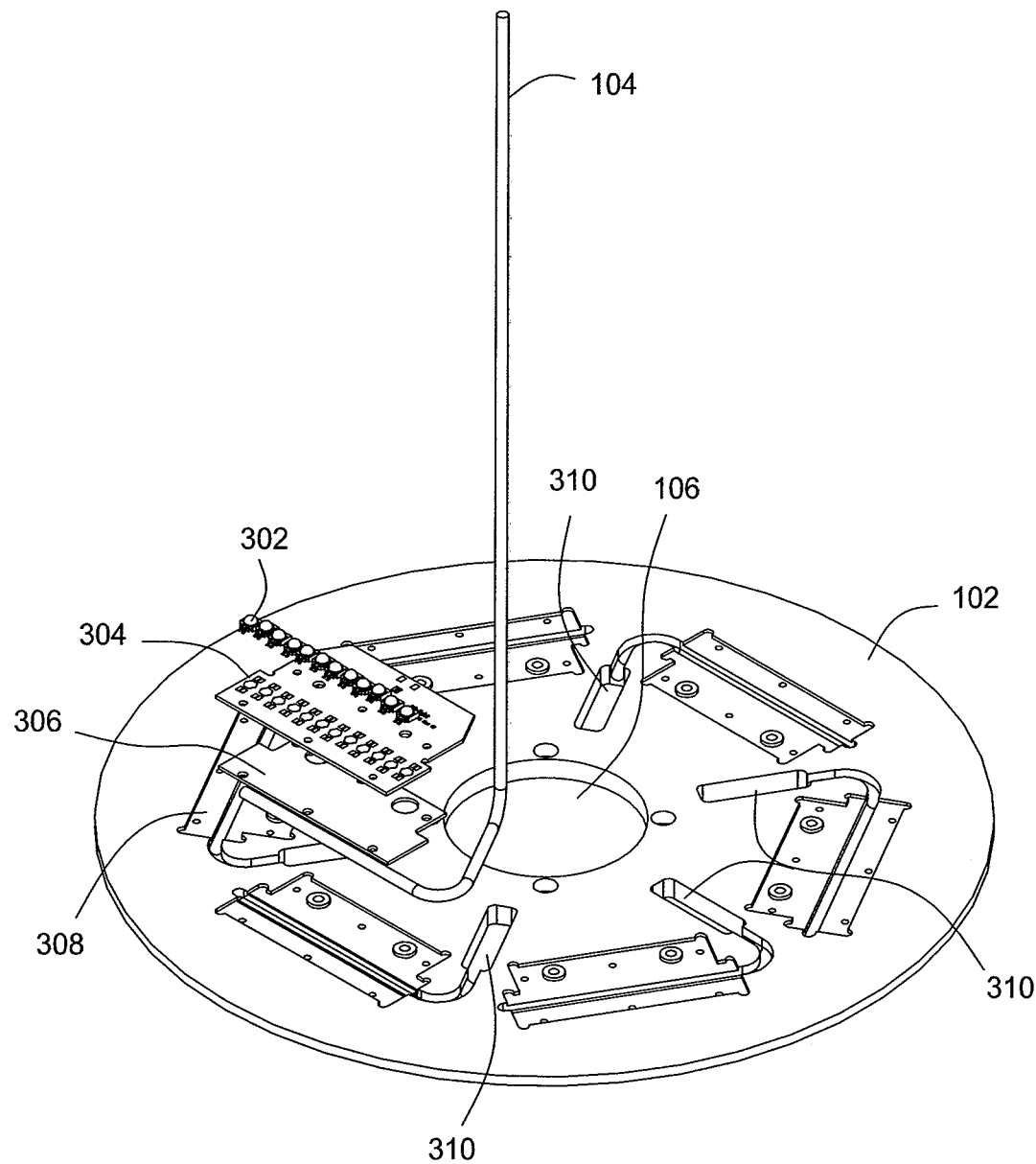
FIG. 3 illustrates an exemplary support plate and heat pipe.

Each support plate 102 has one or more one or more inner openings 106. In one embodiment, the one or more one or more inner openings 106 are a concentric circular opening when the support plate 102 has a circular geometry, for example. In another embodiment, the one or more inner openings 106 may be openings 310 at points around the support plate, as illustrated in FIG. 3 and discussed below. The one or more one or more inner openings 106 allow heat pipes 104 to extend vertically up through each support plate 102. The specific alignment of the heat pipes 104 will be discussed below. Each support plate 102 may have at least one heat pipe 104; however, those skilled in the art will recognize that each support plate 102 may have any number of heat pipes 104 appropriate for sufficiently removing heat away from the LED arrays.

In an alternative embodiment of the present invention, the LED light unit 100 may have no support plates 102. For example, the heat pipes 104 may themselves function as all or part of the support plates 102. The heat pipes 104 may run vertically to a top plate that holds all the heat pipes 104 in position.

Each support plate 102 may be stacked vertically above one another as illustrated by FIG. 1. Each support plate 102 may be coupled to a center column 108. Collars (not shown) may be coupled to the center column 108 to level each support plate 102. One skilled in the art will recognize that the center column 108 may be a single unified segment or a plurality of smaller segments combined to form the center column 108. In addition, the center column 108 may be constructed from a thermally conductive material such as, for example, copper, aluminum and the like.

As discussed above, the amount of light output required by the LED light unit 100 causes LED light unit 100 to generate a large amount of heat. Moreover, due to the packaging of a large number of LEDs required to output up to 20,000 effective candelas or more of light in a small space results in a large concentration of heat. The design of the present invention allows such large number of LEDs to be packaged in a small space while dissipating the heat away from the LEDs. As a result, the lifespan of the LEDs will be greatly extended and a minimal amount of maintenance is required.

The heat pipes 104 provide a way to more efficiently transfer thermal energy away from the LEDs. As heat is generated by the LEDs it is conducted to the support plates 102. The heat pipes 104 may transfer the heat towards the center of the support plate 102 and up towards the open air or a heat sink, as will be discussed below. For example, each level of support plates 102 may have a plurality of heat pipes 104 that all extend vertically upward. Alternatively, each level of support plates 102 may have the heat pipes 104 of each respective support plate 102 coupled to a central heat pipe (not shown) that runs vertically up the center of the LED light unit 100. However, the alternative embodiment will result in an increased number of thermal interfaces between the heat pipes 104 and the heat sink or open air. Thermal interfaces generally add thermal resistance.

The heat pipes 104 may be constructed from a thermally conductive material such as, for example, copper, aluminum and the like. The heat pipes 104 are hollow providing an interior volume. The interior volume of the heat pipes 104 may be filled with a small amount of working fluid such as, for example, water, any alcohol (e.g., ethanol) or a mixture of fluids and a vapor phase of the selected working fluid. An inner wall of the heat pipes 104 may be sintered or grooved to exert a capillary force on the working fluid.

The heat pipes 104 dissipate the heat away from the LEDs by employing evaporative cooling to transfer thermal energy from one point to another by the evaporation and condensation of the working fluid. For example, the vaporization of the working fluid inside the heat pipes 104 by the heat generated by the LEDs causes vapor of the working fluid to form and rise to a highest point of the heat pipes 104, where the vapor is then condensed by the cooler air back to liquid form and then the liquid falls back to the bottom of the heat pipes 104 to start the process over again. The boiling point of the working fluid may be much lower inside the heat pipe 104 than the boiling point of the working fluid outside of the heat pipe 104 due to the reduced pressure inside the heat pipes 104. Consequently, the heat generated by the LEDs may be enough to vaporize the working fluid inside the heat pipes 104 at lower temperatures than in standard atmospheric conditions.

It should be noted that the present invention is not limited to any particular heat pipe structures. Heat pipes as used in the present invention having alternative structures are within the scope of the present invention. For example, heat pipes 104 may actually be a heat plate or a sheet. In addition, the heat pipes 104 of various shapes (e.g., circular or polygonal) and sizes which make use of this same liquid/vapor thermal transfer mechanism may be used.

The working fluid used inside the heat pipes 104, a diameter and a length of the heat pipes 104 are a function of the temperature conditions in which the heat pipes 104 must operate. In an exemplary embodiment of the present invention, the heat pipes 104 contain water. Regarding the diameter of the heat pipes 104, the distance the heat must travel may dictate the diameter. Larger diameters are more expensive and more difficult to move or bend slightly in manufacturing. In an exemplary embodiment of the present invention, the diameter of the heat pipes 104 is approximately 5 to 6 millimeters (mm). Similar to diameter, the distance the heat must travel and the cost to manufacture may dictate the length of the heat pipes 104. In an exemplary embodiment of the present invention, the length of the heat pipes 104 is approximately 0.5 ft. to 2.0 ft.

Figure 2:
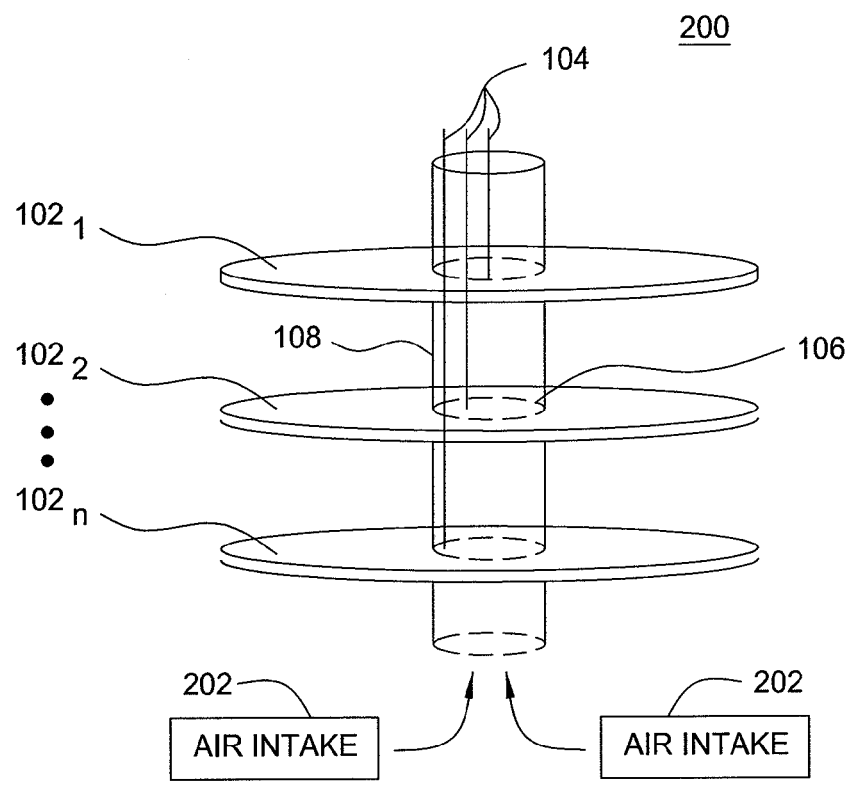
FIG. 2 illustrates a high level block diagram of another exemplary embodiment of the present invention.

FIG. 2 illustrates a high level block diagram of another exemplary embodiment of an LED light unit 200 of the present invention. The LED light unit 200 is similar structurally to the LED light unit 100 in all respects. However, the LED light unit 200 may comprise at least one air intake 202 to provide greater transfer of heat away from the heat pipes and, therefore, away from the LEDs. As illustrated by FIG.

2, air intake 202 may provide an air flow through the one or more one or more inner openings 106 and/or the center column 108 to create an "updraft" to help facilitate the heat transfer provided by the heat pipes 104. Alternatively, a cooling fan or other cooling mechanism may be used to create the "updraft". In one embodiment, heat sink fins may be attached to the heat pipes 104 within the center column 108 to increase the cooling.

FIG. 3 illustrates an exemplary support plate 102 and one heat pipe 104 in greater detail. As discussed above, each support plate 102 may have at least one array of LEDs 302. The LED array 302 comprises a plurality of individual LEDs placed adjacently to one another generally in a line, as illustrated in FIG. 3. For example, the LEDs may be slightly staggered along the line. The LEDs used in LED array 302 may be any type of LED. For example, the LEDs may be any color or constructed from any material.

The LED array 302 may be coupled to an LED board 304. The LED board 304 may be constructed from any thermally conductive material such as, for example, copper, aluminum and the like. The LED board 304 may then be coupled to a heat collector 306. The heat collector 306 may also be constructed from any thermally conductive material such as, for example, copper, aluminum and the like. The heat collector 306 may be any shape or have any dimensions. For example, the heat collector 306 may be a plate and the dimensions of the heat collector 306 may be similar in geometry to the LED board 304.

The heat pipe 104 may be coupled to the heat collector 306. However to minimize the number of interfaces that the heat must be carried through and to maximize the heat transfer away from the LED array 302, the heat pipe 104 may be directly coupled to the heat collector 306. Moreover, the heat pipe 104 is strategically placed directly underneath the LED array 302 such that the heat pipe runs parallel to the LED array 302. Consequently, the distance between the heat pipe 104 and each of the LEDs in the LED array 302 is minimized. This is illustrated by FIG. 3. This particular placement of the heat pipes 104 relative to the LED array 302 also helps to maximize the efficiency of the heat transfer away from the LED array 302. In an alternative embodiment of the present invention, the heat pipe 104 may be coupled directly to the LED board 304 without the use of a heat collector 306.

In one embodiment, the heat pipe 104 runs initially parallel to the support plate 102 and is eventually angled towards the one or more inner openings 106 of the support plate 102. At some point, depending on a relative location of the support plate 102, the heat pipe 104 may be bent to extend vertically upwards. The precise point at where the heat pipe 104 begins to extend vertically upwards will be discussed in further detail below with reference to FIG. 5.

A thermally conductive interface material may be placed in between the LED board 304 and the heat collector 306. The thermally conductive interface material helps to maximize the heat transfer between the LED board 304 and the heat collector 306, which in turn will maximize the heat transfer to the heat pipe 104. The thermally conductive interface material may be for example, a phase change material, a thermal grease, a thermal epoxy or a thermal tape.

Figure 4:
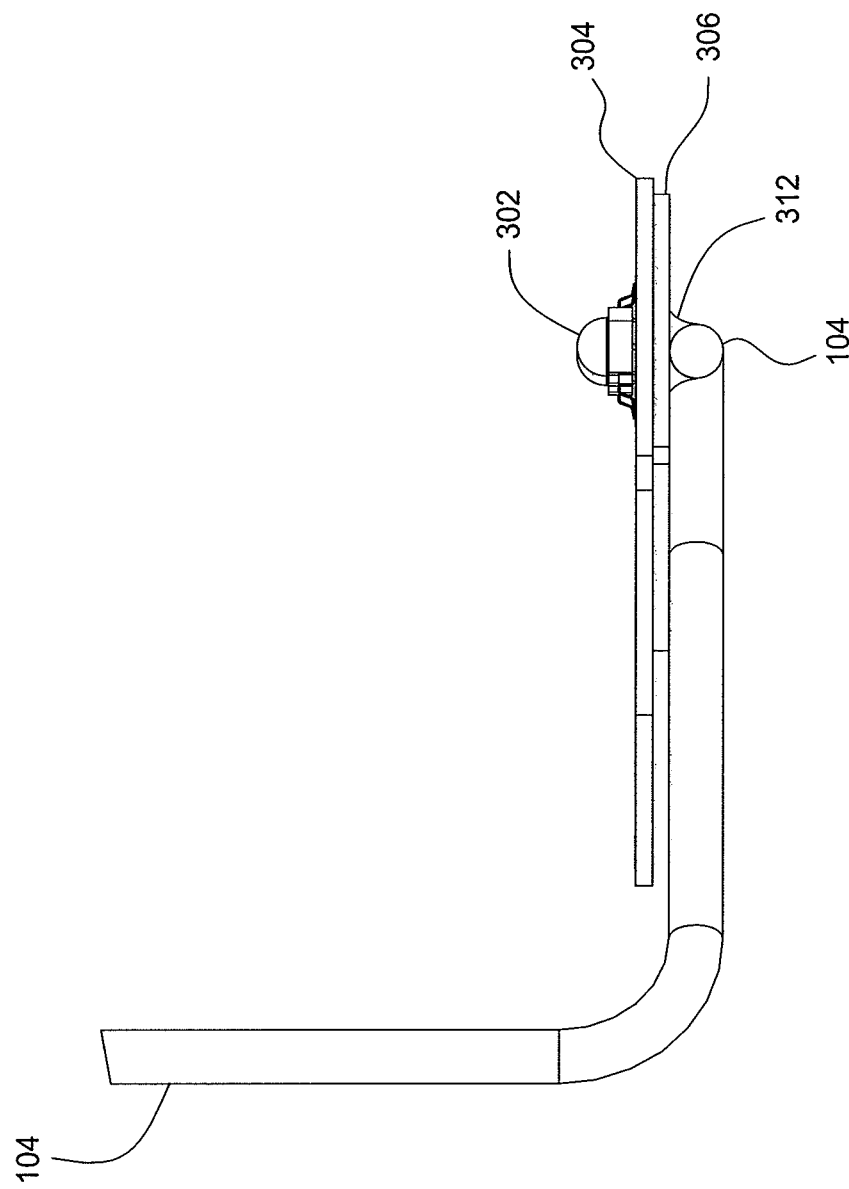
FIG. 4 illustrates a more detailed view of an exemplary heat pipe and associated structures.

A more detailed view of the heat pipe 104 and the associated structures are illustrated in FIG. 4. FIG. 4 illustrates a side view of the heat pipe 104, LED array 302, LED board 304 and heat collector 306. Although not illustrated, the phase change material may be placed in between the LED board 304 and the heat collector 306, as discussed above.

In addition, FIG. 4 illustrates a coupling joint 312. The coupling joint 312 may be formed by welding, soldering or gluing. In another embodiment a mechanical means, such as for example, clamps or screws can be used. Consequently, the number of thermal interfaces may be minimized by coupling the heat pipe 104 directly to the heat collector 306. The heat collector 306 may then be coupled directly to the LED board 304.

Referring back to FIG. 3, the support plate 102 may also comprise a recess 308 for receiving and mounting the LED array 302, LED board 304, heat collector 306 and heat pipe 104. However, as discussed above, in an alternative embodiment of the present invention the LED light unit 100 may have no support plates 102 and the combination of LED board 304, heat collector 306 and the heat pipes 104 may function as the support plate 102.

In an exemplary embodiment of the present invention, the support plate 102 may have six recesses 308 for receiving and mounting six LED arrays 302 and heat pipes 104. Those skilled in the art will recognize that the present invention may have any number of recesses 308 for receiving and mounting any number of LED arrays 302 and heat pipes 104.

Although the exemplary embodiment illustrated in FIG. 3 illustrates the LED array 302, LED board 304 and heat collector 306 in a horizontal configuration, one skilled in the art will recognize that the LED array 302 may have a different mounting configuration. For example, the LED array 302 may be mounted in a vertical plane instead of a horizontal plane as illustrated in FIGS. 3 and 4. The heat pipes 104 may have less bends but still run vertically to a top plate that holds all the heat pipes 104 in position.

In addition, the support plate 102 may also include at least one opening 310. As discussed above, the one or more openings 106 may also include reference to openings 310 and may be used interchangeably herein. The openings 310 may provide for proper alignment of the heat pipes 104, as will be discussed below with reference to FIG. 5. The shape and size of the openings 310 allow the support plate 102 to be used for any level within the LED light unit 100. For example, the openings 310 may be shaped as a slot. Thus, the same support plate 102 may be fabricated the same for every level of the LED light unit 100 even though the positioning of the heat pipes 104 within the openings 310 may be different for each level.

Notably, as discussed above, the support plate 102 is constructed from a thermally conductive material such as, for example, copper, aluminum and the like. Therefore, the present inventive design of the support plate 102 provides redundancy should any of the heat pipes 104 fail. For example, the heat collector 306 coupled to the heat pipe 104 and LED board 304 is in intimate contact with the support plate 102. Consequently, if one of the heat pipes 104 were to fail, the heat may be transferred via the support plate 102 to a functioning heat pipe 104.

In addition, the present inventive design of the support plate 102 allows the support plate 102 to even out the heat generated by the LED array 302 to be dissipated by the heat pipes 104. For example, if the support plate 102 comprises a plurality of LED arrays 302, one of the LED arrays 302 may run much hotter than the other LED arrays 302. This may cause the heat pipe 104 coupled to the hotter LED array 302 to work much harder than the other heat pipes 104. The support plate 102 may alleviate this non-uniformity by tending to even out the heat generated by the LED arrays 302 to be dissipated by the heat pipes 104.

Figure 5:
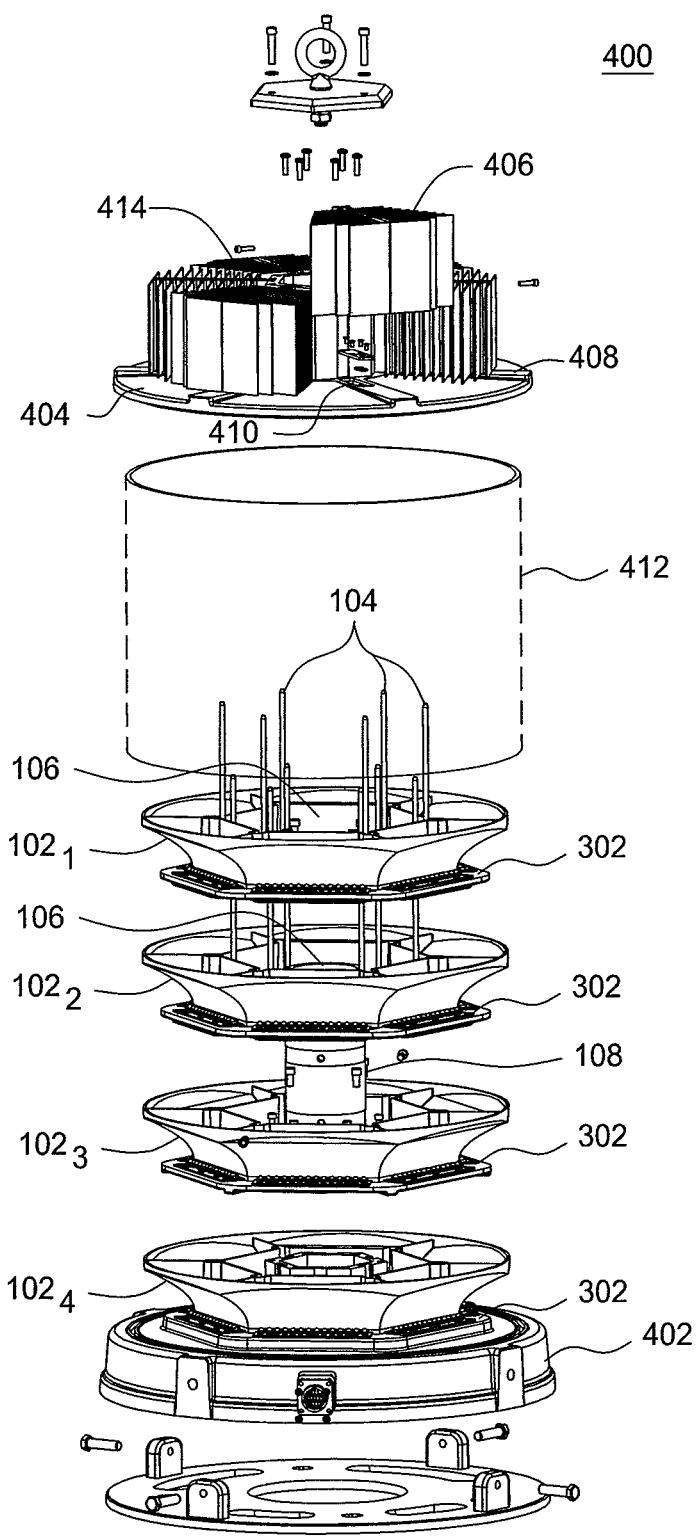
FIG. 5 illustrates an exploded view of an exemplary embodiment of the present invention.

FIG. 5 illustrates an exploded view of an exemplary LED light unit 400 of the present invention. The LED light unit 400 illustrated in FIG. 5 depicts four layers of support plates $102_1$, $102_2$, $102_3$ and $102_4$. However as discussed above, the LED light unit 400 may comprise any number of support plates 102 including no support plates 102 and is constructed to be completely modular.

In an exemplary embodiment, when a plurality of support plates 102 is used for the LED light unit 400, a bottom most support plate $102_4$ may not need heat pipes 104. Rather, the base 402 holding the bottom most support plate $102_4$ may be constructed from any thermally conductive material such as, for example, copper, aluminum and the like and functions to dissipate heat away from the bottom most support plate $102_4$ via a support structure, e.g. a light tower that the LED light unit 400 is coupled to. However, if the base 402 is constructed from a non-thermally conductive material such as, for example, plastic, then the bottom most support plate $102_4$ may also have heat pipes 104.

Each subsequent support plate $102_1$ to $102_3$ may have heat pipes 104 extending vertically through the one or more inner openings 106 or openings 310 (as illustrated in FIG. 3) of each of the support plates $102_1$ to $102_4$. The heat pipes 104 of each support plate $102_1$ to $102_4$ are aligned in a line radially outward from a top most support plate $102_1$ to a support plate $102_3$ directly above the bottom most support plate $102_4$. For example, the top most support plate $102_1$ would have heat pipes 104 extending vertically through the one or more inner openings 106. The heat pipes 104 would be directly adjacent to an edge of the one or more inner openings 106 or opening 310 of the top most support plate $102_1$.

The support plate $102_2$ directly beneath the top most support plate $102_1$ would have heat pipes 104 extending vertically through the respective one or more inner openings 106 or openings 310 of both support plate $102_2$ and the top most support plate $102_1$. However, the heat pipes 104 of the support plate $102_2$ would begin extending vertically upward slightly more towards the center (i.e. radially inward) then the heat pipes 104 of the top most support plate $102_1$. Thus, the heat pipes 104 of the support plate $102_2$ would extend vertically adjacent to the heat pipes 104 of the top most support plate $102_1$ linearly in a radially inward position. The heat pipes 104 of each subsequent support plate (e.g. $102_3$) below would follow in a similar fashion. If the heat pipes run through an opening 310, the opening 310 may guide the positioning of each of the heat pipes 104 as described above.

Figure 6:
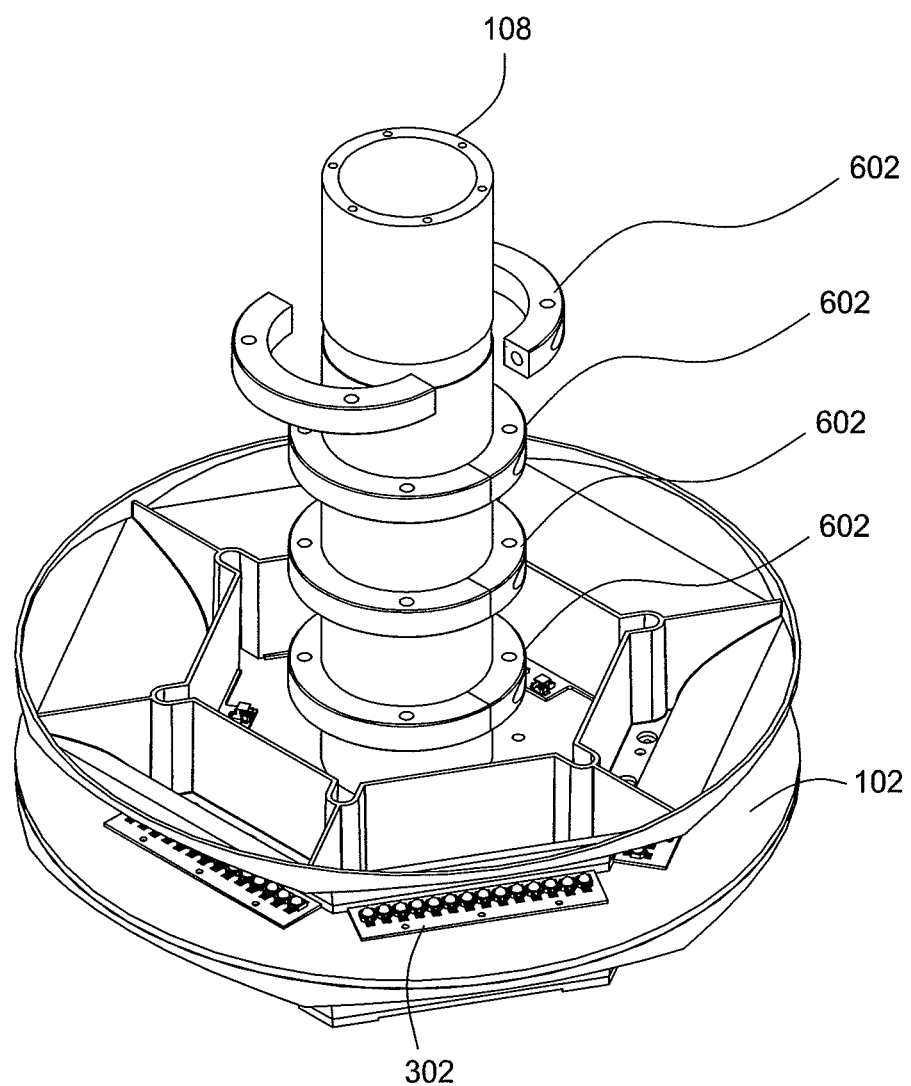
FIG. 6 illustrates an exemplary center column of the present invention.

Each support plate $102_1$ to $102_4$ may be coupled to the center column 108. At least one collar 602 may be coupled to the center column 108 via pins (not shown), as illustrated in FIG. 6. The collar 602 provides spacing and a level for each support plate $102_1$ to $102_4$. In addition, the collar 602 may also be constructed from any thermally conductive material such as, for example, copper, aluminum and the like to also help maximize the efficiency of heat transfer away from the LED arrays 302 and to the heat pipes 104.

Referring back to FIG. 5, a lens cover 412 may be used to seal LED light unit 400 and a plate 404 supporting at least one heat sink 406. The lens cover 412 may be constructed from a transparent material such as, for example, glass or plastic in order to allow the light generated by the LEDs to exit the unit. The lens cover 412 helps to prevent exterior elements such as, for example, moisture and dust, from entering the LED light unit 400.

The LED light unit 400 may also comprise at least one heat sink 406 mounted on an exterior column 414 of the plate 404, as discussed above. A more detailed description of how the at least one heat sink 406 mounts to the exterior column 414 will be discussed below with reference to FIG. 7. The exterior column 414 and plate 404 may be fabricated from a single piece of material or may be fabricated separately and subsequently coupled together to form a single piece. In an exemplary embodiment illustrated by FIG. 5, six heat sinks 406 are used. One skilled in the art will recognize that the present invention is not limited to any particular number of heat sinks. Any number of heat sinks 406 may be used for the present invention.

The plate 404 may be constructed from any thermally conductive material such as, for example, copper and aluminum. The plate 404 comprises ridges 408 that may be slightly raised from a plane of the plate 404. The areas other than the ridges 408 may slope outward away from the center of the plate 404. The ridges 408 allow the heat sink 406 to be mounted such that air may flow underneath the heat sink 406 to maximize cooling. In addition, the ridges 408 allow any moisture to fall away from the center of the LED light unit 400. Thus, moisture is prevented from leaking into the LED light unit 400.

The plate 404 may also comprise a plurality of holes 410 in each of the ridges 408 for receiving the heat pipes 104. The heat pipes 104 extend vertically though the plate 404 and the holes 410 into the heat sink 406. Thus, the heat sink 406 surrounds the heat pipes 104 to maximize the cooling. A sealing structure, e.g., an o-ring may be placed in each of the holes 410 to create a seal around the heat pipes 104, thereby preventing any moisture from leaking into the LED light unit 400 via the holes 410.

The heat sink 406 may comprise a plurality of fins to maximize the surface area of the heat sink 406. This helps to maximize the cooling efficiency. In one embodiment, each heat sink 406 may comprise two separate parts.

Figure 7:
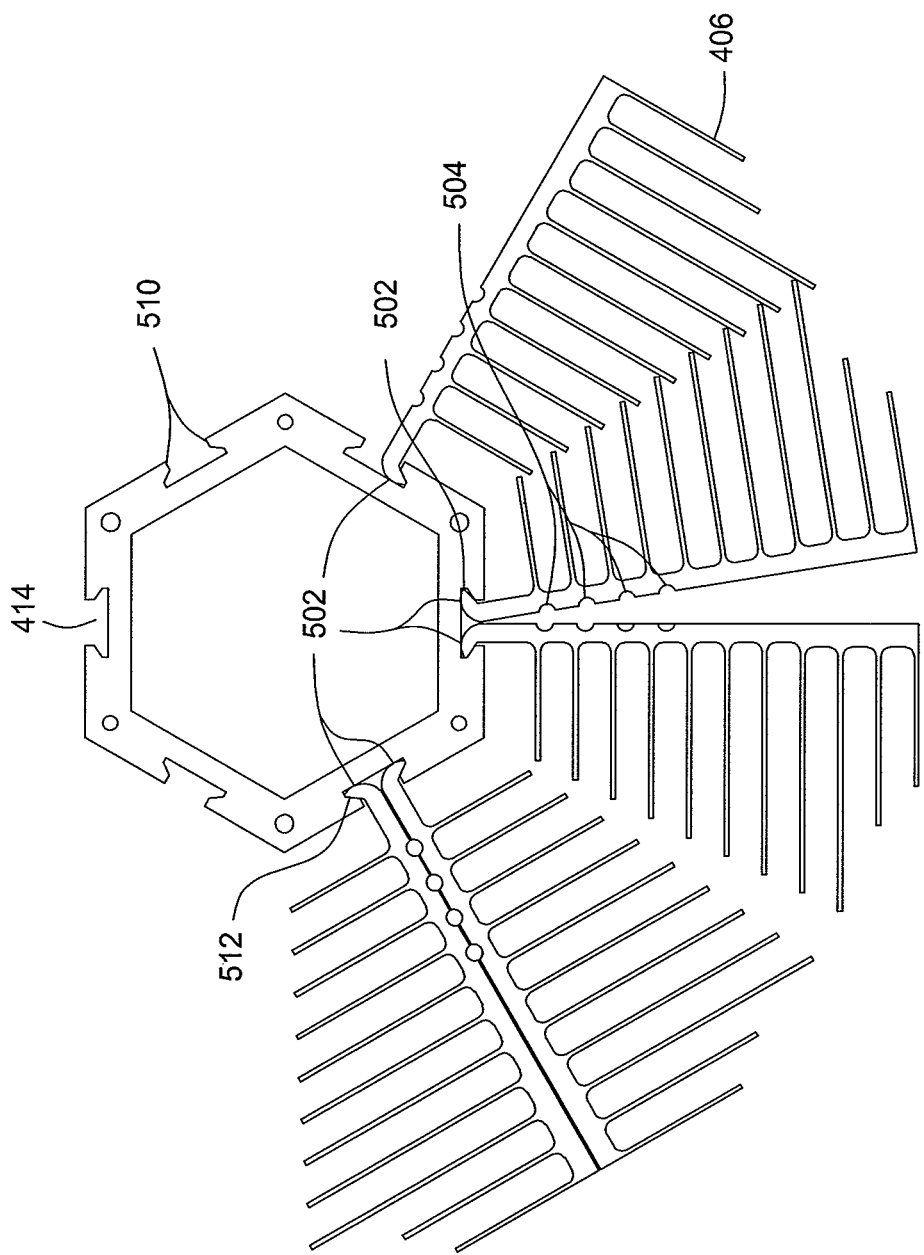
FIG. 7 illustrates a top view of an exemplary heat sink.

FIG. 7 illustrates a top view of an exemplary heat sink 406 of the present invention. As discussed above, the heat sink 406 may actually comprise two separate parts. The two separate parts of the heat sink 406 may be connected to the plate 402 via a dove tail connection 502. As illustrated in FIG. 7, each part of the heat sink 406 has an end 512 that is slightly curled. The slightly curled end 512 of each part of the heat sink 406 interlocks with a corresponding end 510 of the exterior column 414, thus forming the dove tail connection 502.

The dove tail connection 502 provides easier assembly and mounting of the heat sink 406 to the exterior column 414. For example, the dove tail connection 502 allows each part of the heat sink 406 to swing open and close. Thus, during manufacturing of the LED light unit 400, if a plurality of heat sinks 406 is used, a last one of the plurality of heat sinks 406 may be placed much easier in between the other heat sinks 406.

In addition, the heat sink 406 may comprise a plurality of grooves 504 on each of the two parts of the heat sink 406. When the two parts of the heat sink 406 are coupled together, the grooves 504 create a circular aperture having a diameter substantially equal to the diameter of the heat pipes 104. The grooves 504 are also positioned to be aligned with the position of the holes 410 of plate 404 and the heat pipes 104. As discussed above, the heat pipes 104 vertically extend through the plate 404 and holes 410 to be surrounded by the heat sink 406 to maximize cooling. A thermally conductive interface material may be used in the grooves 504 to take up any gaps between the heat pipes 104 and the grooves 504. This maximizes the thermal transfer.

In an alternative embodiment, the heat sink 406 may actually comprise a single piece. Consequently, the heat sink 406 may have a plurality of holes for inserting the heat pipes 104. The heat pipes 104 may have a tapered end to be inserted into the holes of the heat sink 406. In addition, the holes may be filled with a thermally conductive interface material to fill any gaps between the heat pipes 104 and the holes.

In another alternative embodiment, the heat sinks 406 and plate 404 illustrated in FIG. 5, may comprise a single solid continuous piece. Similar to the alternative embodiment where the heat sink 406 is a single piece discussed above, the single piece heat sink may have a plurality of holes for inserting the heat pipes 104. Again, the heat pipes 104 may have a tapered end to be inserted into the holes of the heat sink 406. In addition, the holes may be filled with a thermally conductive interface material to fill any gaps between the heat pipes 104 and the holes.

Figure 8:
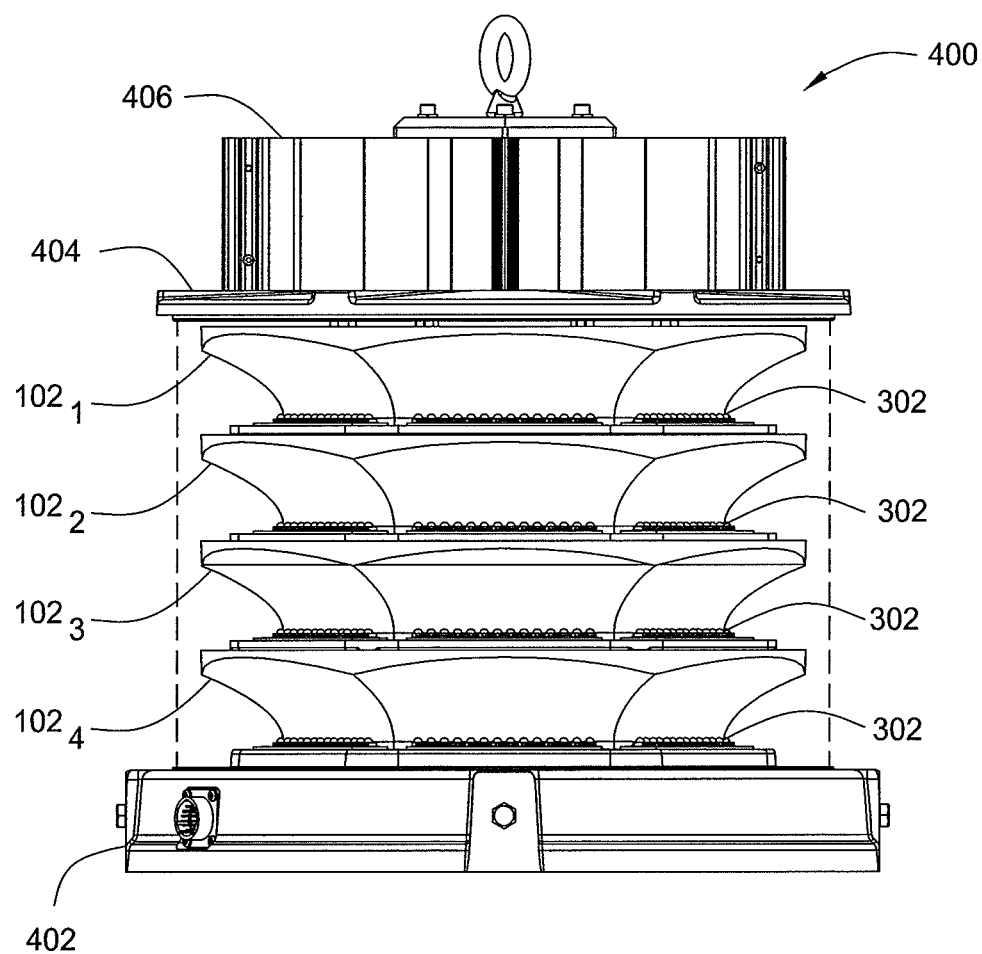
FIG. 8 illustrates an exemplary fully assembled side view of the present invention.

FIG. 8 illustrates a side view of a fully assembled exemplary LED light unit 400 of the present invention. As illustrated by FIG. 8, the LED light unit 400 may be completely sealed from being exposed to external elements such as, for example, wind, rain, hail, snow, dust, debris and the like. This helps to ensure maximum extended life of the LEDs and minimal required maintenance of the LED light unit 400.

Figure 9:
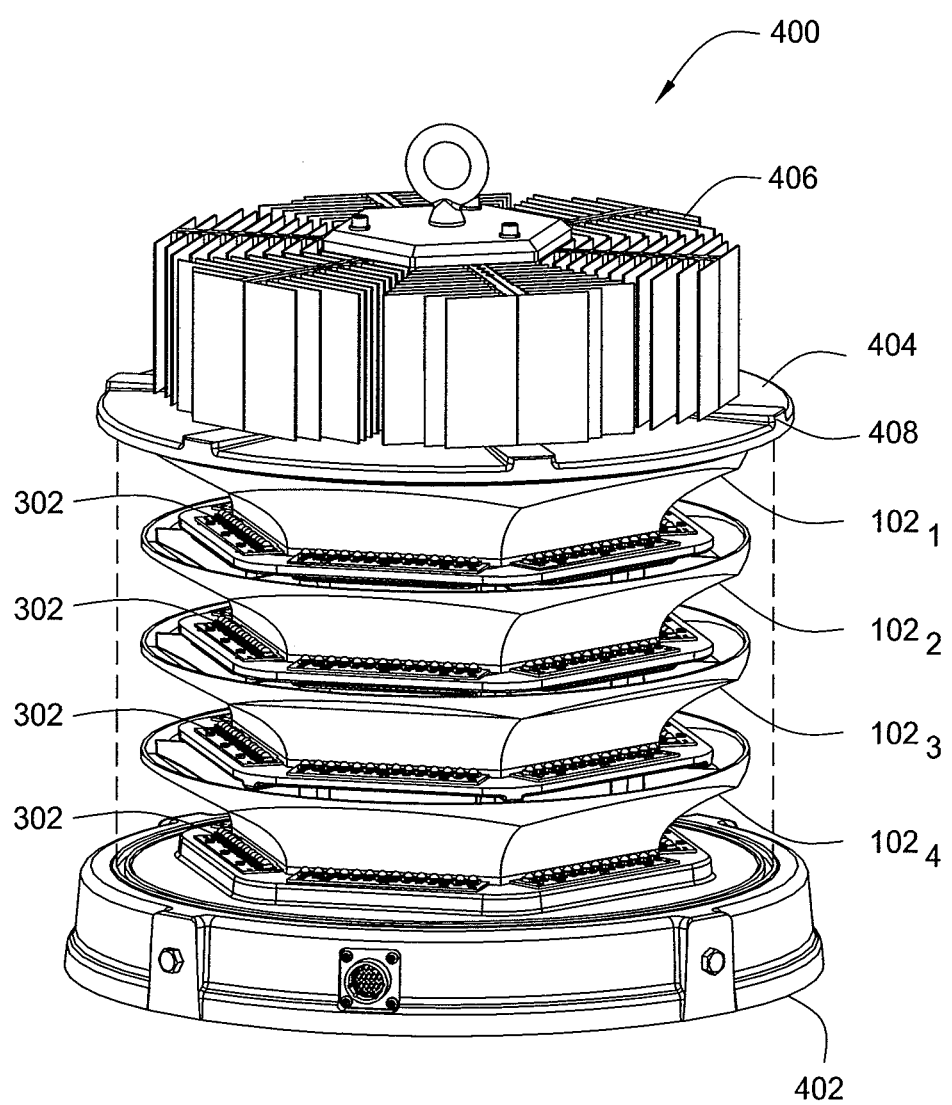
FIG. 9 illustrates an exemplary fully assembled isometric view of the present invention.

FIG. 9 illustrates an isometric view of a fully assembled exemplary LED light unit 400 of the present invention. As illustrated by FIGS. 8 and 9, the LED light unit 400 is advantageously designed to be compact. Thus, the LED light unit 400 may be mounted for various applications such as, for example, on tops of radio transmission towers, wind turbine generators and refinery stacks without the use of heavy machinery or cranes. An operator may carry the LED light unit 400.

Figure 10:
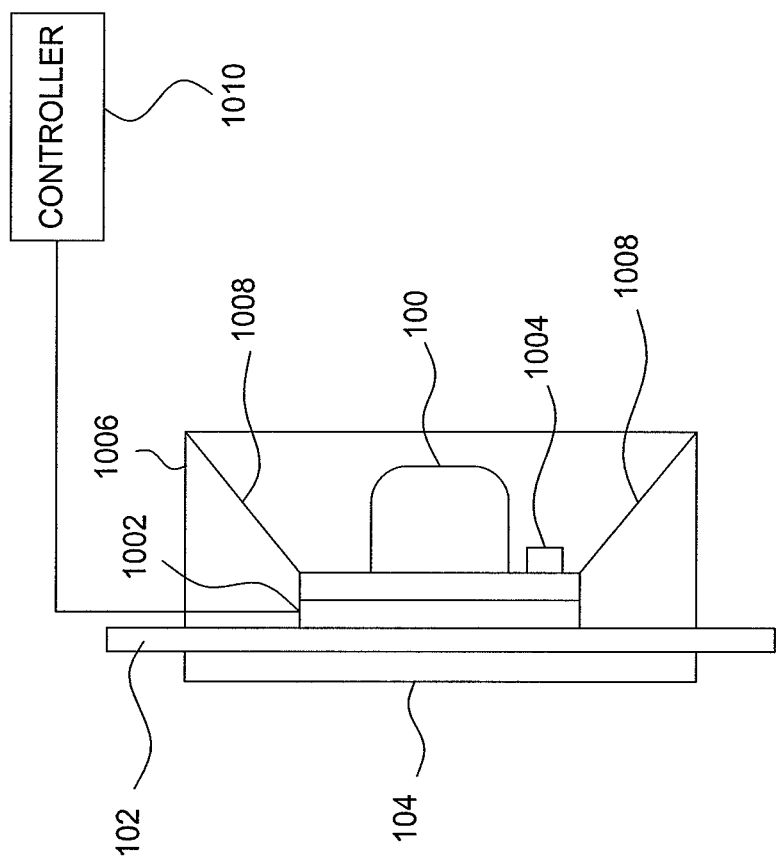
FIG. 10 illustrates an alternate embodiment of a LED light unit.

FIG. 10 illustrates another embodiment of an LED light unit 1000 using the heat pipes 104 of the present invention. In one embodiment, the LED light unit 1000 may be used as a head light or forward light of a vehicle, for example, automobiles, planes, trains, all terrain vehicles (ATV), and the like.

In one embodiment, the LED light unit 1000 includes a support plate 102. One or more heat pipes 104 may be coupled to a first side of the support plate 102. For example a single heat pipe may be welded in a spiral shape around the support plate 102 or a plurality of individual heat pipes 104 may be coupled to the support plate 102. In addition, one or more heat sinks may be coupled to the one or more heat pipes 104, e.g., heat sinks 406.

On a second side, opposite the first side of the support plate 102, the LED light unit 1000 may include a thermoelectric cooler 1002, at least one LED 100 and at least one temperature sensor 1004. In addition, the LED light unit 1000 may include one or more reflectors 1008 and a housing 1006 coupled to the support plate 102 and covering the at least one LED 100.

In one embodiment, the thermoelectric cooler 1002 may be a Peltier device or a micro-Peltier device that can be used to cool objects such as electronic components. Although, device 1002 is referred to as a thermoelectric cooler, it should be noted that the thermoelectric cooler may also be used for heating. In other words, the thermoelectric cooler 1002 can also be used in a reverse mode in order to heat electronic components, such as the LED light unit 1000.

In one embodiment, the temperature sensor 1004 may monitor the temperature of the LED 100. It should be noted that any number of temperature sensors 1004 may be used and that they may be located anywhere within the LED light unit 1000. For example, additional temperature sensors 1004 may be placed on the housing 1006, on an LED circuit board of the LED 100, on the support plate 102, or anywhere on the LED light unit 1000 as to monitor ambient air temperature.

In one embodiment, the LED light unit 1000 may also include a controller 1010. The controller 1010 may include a processor, a memory and one or more input/output devices. The memory may be any type of computer readable storage medium for storing a plurality of instructions, the plurality of instructions, which when executed by the processor, cause the processor to perform a method for controlling a temperature of the at least one LED 100. The controller 1010 may be coupled to the thermoelectric cooler 1002 and the at least one temperature sensor 1004. A feedback loop may be used between the at least one temperature sensor 1004, the thermoelectric cooler 1002 and the controller 1010. In one embodiment, the controller 1010 may include one or more analog amplifiers or comparators. The controller 1010 may target a specific set point temperature at which to maintain the temperature. In another embodiment, thresholds may be used to turn on the thermoelectric cooler 1002.

The feedback loop may be used to automatically control the temperature of the LED 100 or any other component that contains a temperature sensor 1004. For example, a predefined high threshold may be associated with the LED 100. In one embodiment, the predefined high threshold may be less than 80 degrees Celsius (° C.). In a further embodiment, the predefined high threshold may be more than 25° C. Thus, when the temperature sensor 1004 detects that the LED 100 has reached the predefined high threshold, a signal may be sent to the controller 1010. Subsequently, the controller 1010 may send a control signal to the thermoelectric cooler 1002 to cool the LED 100.

In one embodiment, a predefined low threshold may be associated with the LED 100. For example, the predefined low threshold may be greater than −5° C. In a further embodiment, the predefined low threshold may be less than 10° C. Thus, when the temperature sensor 1004 detects that the LED 100 has reached the predefined low threshold, a signal may be sent to the controller 1010. Subsequently, the controller 1010 may send a control signal to the thermoelectric cooler 1002 to heat the LED 100. It should be noted that any temperature may be used as the predefined threshold. However, choosing proper low and high threshold temperatures may ensure optimal power use and performance.

In the heating mode, the LEDs 100 may be turned on with the thermoelectric cooler 1002 to maximize heating and therefore melting of snow and ice. Head lamps of both a high-beam mode and low-beam mode may utilize the inventions herein. The high-beam mode normally consumes more power and therefore creates more heat. In the case of a headlamp, the LEDs 100 may be operated in the high-beam mode with the thermoelectric cooler 1002 in heating mode in order to maximize heat from the LEDs 100.

The control signal to the thermoelectric cooler 1002 may also be operated in a continuous and variable manner. The thermoelectric cooler 1002 would, therefore, be either heating or cooling in order to maintain the temperature at a particular set point. In one embodiment, the set point is between 0° C. and 40° C. In one embodiment the control signal may be a variable current. In another embodiment the control signal may be a variable duty cycle. The duty cycle may varied by either pulse width modulation, frequency modulation, or pulse density modulation.

In one embodiment two or more thermoelectric coolers 1002 are used together. The two or more thermoelectric coolers 1002 may be arranged in a parallel or series configuration. The two or more thermoelectric coolers 1002 may by positioned in a back-to-back or a side-by-side configuration Employing low thermal resistance components, such as heat pipes 104, with the thermoelectric cooler 1002 increases the efficiency of the thermoelectric cooler 1002. This applies to both heating and cooling with the thermoelectric cooler 1002.

The feedback loop may continuously receive data from the temperature sensor 1004 such that the thermoelectric cooler 1002 may be essentially continuously turned on and off by the controller 1010 as needed based upon the temperature.

In one embodiment, the controller 1010 may be programmed to turn on and off the thermoelectric cooler 1002 irrespective of the temperature. For example, when then LED light unit 1000 is installed in a vehicle, when the vehicle is moving, the thermoelectric cooler 1002 may not need to be turned on as increased air flow over the LED light unit 1000 may keep the LED 100 below the predefined threshold temperature.

In one embodiment, the controller 1010 may be located remotely. For example, the controller 1010 may be located within a display console or dashboard of the vehicle. This would allow a driver of the vehicle to set the predefined temperatures for cooling and heating or manually turning on and off the thermoelectric cooler 1002 using the input/output devices that are part of the controller 1010.

In one embodiment, the combination of the thermoelectric cooler 1002 and the heat pipes 102 may increase the efficiency of heat removal from the LED 100. For example, the heat pipes 102 may be connected to a metal part of a vehicle, e.g., a bumper, chassis and the like. As a result, the heat pipes 102 may also remove heat away from the LED 100 and out through the vehicle.

Alternatively, the heat pipes may be coupled to housing 1006. As a result, as heat is dissipated away from the LED 100 to the heat pipes 102, the heat may be transferred from the heat pipes 102 to the housing 1006. This may be especially helpful during the winter when the LED light unit 1000 may collect snow and ice. The heat dissipated away from the LED 100 may be used to heat and melt the snow and ice off of an exterior side of the housing 1006.

Figure 11:
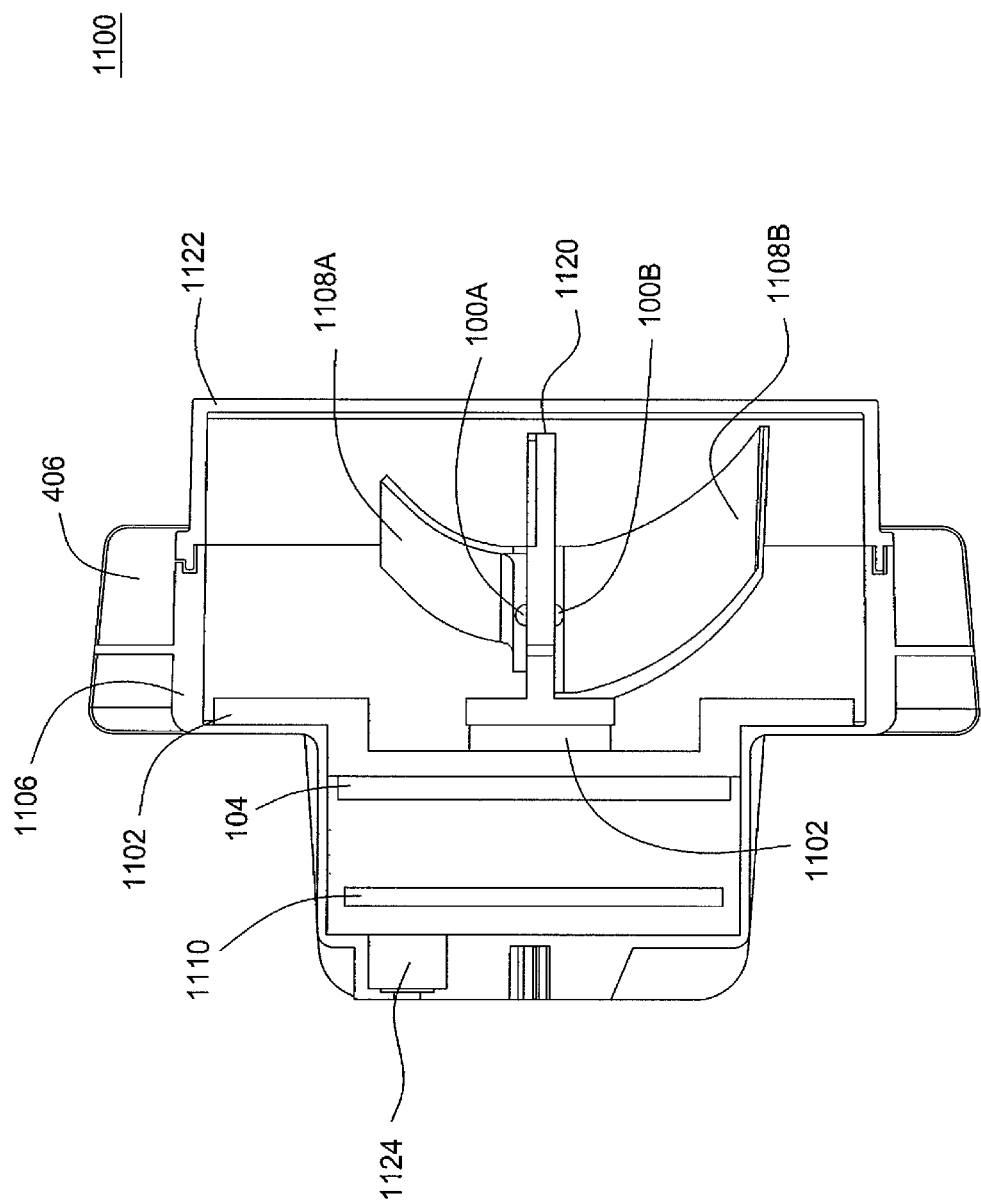
FIG. 11 illustrates an alternate embodiment of a LED light unit.

FIG. 11 illustrates another embodiment of an LED light unit 1100. As mentioned, a thermoelectric cooler may be used with LEDs in a headlamp. Similar to the LED light unit 1000, the LED light unit 1100 may include a support plate 1102 and one or more heat pipes 104 coupled to the support plate 1102. It should be noted that in the embodiment illustrated in FIG. 11, the one or more heat pipes 104 are optional.

However, in the embodiment illustrated in FIG. 11, the LED light unit 1100 may include LEDs 100A and 1008 (hereinafter also referred to collectively as LEDs 100) and may be mounted on a top side and a bottom side of a plate 1120. The LED light unit 1100 may also only include LEDs 100A or 100B mounted on a top side or a bottom side of a plate 1120. It should be noted that the LEDs 100 may also be mounted on the plate 1120 that is then positioned 90 degrees with respect to the thermoelectric cooler 1102 or on a plate 1120 that is positioned parallel to the thermoelectric cooler 1102. In one embodiment, one or more reflectors 1108A and 11088 (hereinafter also referred to collectively as reflectors 1108) may be coupled to each one of the LEDs 100.

The plate 1120 may be part of the housing 1106 or the plate 1120 may be a separate component that is then mounted to the housing 1106. The housing 1106 may be made of a metal, for example aluminum, to dissipate heat. The housing 1106 may have a light cover 1122 at one side. The light cover 1122 may be made of plastic or glass.

The LED light unit 1100 may also include a power supply and controller unit 1110 and a cable entry 1124. The power supply and controller unit 1110 may also be connected to one or more temperature sensors (not shown) to create a feedback loop to control the thermoelectric cooler 1102 similar to the configuration associated with the LED light unit 1000 discussed above.

The electrical circuitry within the LED light unit 1100 may have a coating to protect the LED light unit 1100 from water. The coating may be a conformal coating or a potting material. The coating may cover the LEDs 100, the power supply and the controller unit 1110, and associated wiring. The LED light 1100 may also include a heat sink or heat sink fins 406, as discussed above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for controlling a temperature of at least one light emitting diode (LED) in a vehicle comprising:
    receiving a predefined temperature threshold selected by a driver of the vehicle via a controller located in a display console of the vehicle;
    receiving a temperature reading of said at least one LED;
    comparing said temperature reading to the predefined threshold selected by the user; and
    adjusting a temperature of said at least one LED via at least one heat pipe that removes heat away from the at least one LED via a metal portion of the vehicle connected to the at least one heat pipe based upon said comparing, wherein said at least one heat pipe comprises an interior volume filled with a working fluid.

2. The method of claim 1, wherein said temperature reading is received from a temperature sensor coupled to said at least one LED.

3. The method of claim 1, wherein said comparing comprises:
    determining if said temperature reading is above the predefined temperature threshold.

4. The method of claim 3, wherein said adjusting comprises:
    lowering said temperature of said at least one LED via at least one of: a thermoelectric cooler coupled to said at least one LED or the at least one heat pipe coupled to said at least one LED.

5. The method of claim 1, wherein said comparing comprises:
    determining if said temperature reading is below the predefined temperature threshold.

6. The method of claim 5, wherein said adjusting comprises:

increasing said temperature of said at least one LED via a thermoelectric cooler coupled to said at least one LED.

7. The method of claim 3, wherein said receiving and said comparing are performed continuously.

8. A non-transitory computer-readable storage medium storing a plurality of instructions which, when executed by a processor of a controller, cause the processor to perform operations for controlling a temperature of at least one light emitting diode (LED) in a vehicle, the operations comprising:
receiving a predefined temperature threshold selected by a driver of the vehicle via a controller located in a display console of the vehicle;
receiving a temperature reading of said at least one LED;
comparing said temperature reading to the predefined threshold selected by the user; and
adjusting a temperature of said at least one LED via at least one heat pipe that removes heat away from the at least one LED via a metal portion of the vehicle connected to the at least one heat pipe based upon said comparing, wherein said at least one heat pipe comprises an interior volume filled with a working fluid.

9. The non-transitory computer-readable storage medium of claim 8, wherein said temperature reading is received from a temperature sensor coupled to said at least one LED.

10. The non-transitory computer-readable storage medium of claim 8, wherein said receiving and said comparing are performed continuously.

11. The non-transitory computer-readable storage medium of claim 8, wherein said comparing comprises:
determining if said temperature reading is above the predefined temperature threshold.

12. The non-transitory computer-readable storage medium of claim 11, wherein said adjusting comprises:
lowering said temperature of said at least one LED via at least one of: a thermoelectric cooler coupled to said at least one LED or the at least one heat pipe coupled to said at least one LED.

13. The non-transitory computer-readable storage medium of claim 8, wherein said comparing comprises:
determining if said temperature reading is below the predefined temperature threshold.

14. The non-transitory computer-readable storage medium of claim 13, wherein said adjusting comprises:
increasing said temperature of said at least one LED via a thermoelectric cooler coupled to said at least one LED.

15. A controller, comprising:
a processor; and
a non-transitory computer-readable storage medium storing a plurality of instructions which, when executed by the processor, cause the processor to perform operations for controlling a temperature of at least one light emitting diode (LED) in a vehicle, the operations comprising:
receiving a predefined temperature threshold selected by a driver of the vehicle via a controller located in a display console of the vehicle;
receiving a temperature reading of said at least one LED;
comparing said temperature reading to the predefined threshold selected by the user; and
adjusting a temperature of said at least one LED via at least one heat pipe that removes heat away from the at least one LED via a metal portion of the vehicle connected to the at least one heat pipe based upon said comparing, wherein said at least one heat pipe comprises an interior volume filled with a working fluid.

16. The controller of claim 15, wherein said temperature reading is received from a temperature sensor coupled to said at least one LED.

17. The controller of claim 15, wherein said receiving and said comparing are performed continuously.

18. The controller of claim 15, wherein said comparing comprises:
determining if said temperature reading is above the predefined temperature threshold.

19. The controller of claim 18, wherein said adjusting comprises:
lowering said temperature of said at least one LED via at least one of: a thermoelectric cooler coupled to said at least one LED or the at least one heat pipe coupled to said at least one LED.

20. The controller of claim 15, wherein said comparing comprises:
determining if said temperature reading is below the predefined temperature threshold; and
wherein said adjusting comprises: increasing said temperature of said at least one LED via a thermoelectric cooler coupled to said at least one LED.

* * * * *